United States Patent [19]

Rapiejko et al.

[11] Patent Number: 5,001,647
[45] Date of Patent: Mar. 19, 1991

[54] INERTIAL TRANSFORMATION MATRIX GENERATOR

[75] Inventors: Stephen J. Rapiejko, Utica; David S. Chan, Schenectady; Daniel A. Staver, Scotia, all of N.Y.; Nancy M. Clark, Mesa, Ariz.

[73] Assignee: General Electric Company, Schenectady, N.Y.

[21] Appl. No.: 401,372

[22] Filed: Aug. 31, 1989

[51] Int. Cl.$^5$ ............... G01C 21/00; G01S 21/00; G06F 7/38; F41G 7/00
[52] U.S. Cl. ............................ 364/453; 364/559; 364/725; 244/3.2
[58] Field of Search ............... 364/433, 434, 447, 453, 364/454, 553, 559, 715.03, 725; 244/3.2, 3.21

[56] References Cited

U.S. PATENT DOCUMENTS

| | | | |
|---|---|---|---|
| 3,412,239 | 11/1968 | Seliger et al. | 364/453 |
| 3,545,266 | 12/1970 | Wilson | 364/453 X |
| 4,038,527 | 7/1977 | Brodie et al. | 364/453 |
| 4,791,573 | 12/1988 | Zemany et al. | 364/453 X |

Primary Examiner—Parshotam S. Lall
Assistant Examiner—E. J. Pipala
Attorney, Agent, or Firm—Allen L. Limberg; James C. Davis, Jr.; Marvin Snyder

[57] ABSTRACT

An inertial transformation matrix generator generates a succession of Euler transformation matrices in inertial coordinates, and is useful for converting to inertial coordinates the responses of a sensor hard mounted on the hull of a craft (e.g., an aircraft). First, second and third rate-sensing gyros located proximately to said sensor are strapped down to the craft hull, and are oriented to sense the motion of the craft hull in three mutually orthogonal directions, for providing respective output signals indicative of components of craft hull motion in each of those three mutually orthogonal directions. The output signals of the gyros are digitized, and based on these digital signals successive incremental Euler transformation matrices are generated. Each successive incremental Euler transformation matrix and a respective other matrix are multiplied together to generate a respective product matrix, said other matrix initially being a initialization matrix and thereafter being the previously calculated Euler transformation matrix. Each successive current Euler transformation matrix is formed from each successive product matrix, which is done in preferred embodiments of the invention by adding to it at selected times a correction matrix derived by long term comparison of the matrices generated by the inertial transformation matrix generator and the inertial navigation system of the craft.

20 Claims, 10 Drawing Sheets

Fig. 3

| STEP NO. | $C_1$ | $C_2$ | $C_3$ | $C_4$ |
|---|---|---|---|---|
| 1 | 1 | 0 | 0 | 0 |
| 2 | 0 | 0 | 0 | 0 |
| 3 | 1 | 0 | 0 | 0 |
| 4 | 0 | 0 | 0 | 0 |
| 5 | 1 | 0 | 0 | 0 |
| 6 | 0 | 0 | 0 | 1 |
| 7 | 1 | 0 | 0 | 0 |
| 8 | 0 | 0 | 0 | 0 |
| 9 | 1 | 0 | 0 | 0 |
| 10 | 0 | 0 | 0 | 0 |
| 11 | 1 | 0 | 0 | 0 |
| 12 | 0 | 0 | 0 | 1 |
| 13 | 1 | 0 | 0 | 0 |
| 14 | 0 | 0 | 0 | 0 |
| 15 | 1 | 0 | 0 | 0 |
| 16 | 0 | 0 | 0 | 0 |
| 17 | 1 | 1 | 0 | 0 |
| 18 | 0 | 1 | 0 | x |
| 19 | 1 | 1 | 0 | x |
| 20 | 0 | 1 | 0 | x |
| 21 | 1 | 1 | 0 | x |
| 22 | 0 | 1 | 0 | x |
| 23 | 1 | 1 | 0 | x |
| 24 | 0 | 1 | 0 | x |
| 25 | 1 | 1 | 1 | 1 |
| 26 | 0 | 1 | 1 | 1 |
| 27 | 1 | 1 | 1 | 1 |
| 28 | 0 | 1 | 1 | 1 |
| 29 | 1 | 1 | 1 | 1 |
| 30 | 0 | 1 | 1 | 1 |
| 31 | 1 | 1 | 1 | 1 |
| 32 | 0 | 1 | 1 | 1 |

| TEMPORARY STORAGE ELEMENTS | STEP NO. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | 401 | | | | | | | | | | | | | | | | |
| | 402 | | | | | | | | | | | | | | | | |
| | 403 | | | | | | | | | | | | | | | | |
| | 404 | | | | | | | | | | | | | | | | |
| | 405 | | | | | | | | | | | | | | | | |
| | 406 | | | | | | | | | | | | | | | | |
| | 407 | | | | | | | | | | | | | | | | |
| | 408 | | | | | | | | | | | | | | | | |
| | 409 | | | | | | | | | | | | | | | | |
| | 410 | | | | | | | | | | | | | | | | |
| | 411 | | | | | | | | | | | | | | | | |
| | 412 | | | | | | | | | | | | A | X | D | X | G |
| | 413 | | | | | | | | | | | A | X | D | X | G | A |
| | 414 | | | | | | | | | | A | X | D | X | G | A | B |
| | 415 | | | | | | | | | A | X | D | X | G | A | B | D |
| | 416 | | | | | | | | A | X | D | X | G | A | B | D | E |
| | 417 | | | | | | | A | X | D | X | G | A | B | D | E | G |
| | 418 | | | | | | A | X | D | X | G | A | B | D | E | G | H |
| | 419 | X | X | X | X | A | X | D | X | G | X | B | X | E | X | H | X |

Fig. 4a

| TEMPORARY STORAGE ELEMENTS | STEP NO. | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|
| | 401 | | | | | | | | | | | | | | | | X |
| | 402 | | | | | | | | | | | | | | A | X | D |
| | 403 | | | | | | | | | | | | | A | X | D | A |
| | 404 | | | | | | | | | | | | A | X | D | A | G |
| | 405 | | | | | | A | X | D | X | G | A | B | D | E | G | H |
| | 406 | | | | | A | X | D | X | G | A | B | D | E | G | H | B |
| | 407 | | | | A | X | D | X | G | A | B | D | E | G | H | B | C |
| | 408 | | | A | X | D | X | G | A | B | D | E | G | H | B | C | E |
| | 409 | | A | X | D | X | G | A | B | D | E | G | H | B | C | E | F |
| | 410 | | | | | | | | | | | | | | | | A |
| | 411 | | | | | | | | | | | | | | A | X | A |
| | 412 | A | B | D | E | G | H | B | C | E | F | H | _ | C | X | F | X |
| | 413 | B | D | E | G | H | B | C | E | F | H | _ | C | X | F | X | _ |
| | 414 | D | E | G | H | B | C | E | F | H | _ | C | X | F | X | _ | |
| | 415 | E | G | H | B | C | E | F | H | _ | C | X | F | X | _ | | |
| | 416 | G | H | B | C | E | F | H | _ | C | X | F | X | _ | | | |
| | 417 | H | B | C | E | F | H | _ | C | X | F | X | _ | | | | |
| | 418 | B | C | E | F | H | _ | C | X | F | X | _ | | | | | |
| | 419 | C | X | F | X | _ | | | | | | | | | | | |

Fig. 4b

| TEMPORARY STORAGE ELEMENTS | STEP NO. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| | 401 | A | A | D | D | G | G | B | B | E | E | H | H | C | C | I | F |
| | 402 | A | G | D | B | G | E | B | H | E | C | H | F | C | I | F | A |
| | 403 | G | D | B | G | E | B | H | E | C | H | F | C | I | F | A | I |
| | 404 | D | B | G | E | B | H | E | C | H | F | C | I | F | A | I | D |
| | 405 | B | C | E | F | H | I | C | A | F | D | I | G | A | B | D | E |
| | 406 | C | E | F | H | I | C | A | F | D | I | G | A | B | D | E | G |
| | 407 | E | F | H | I | C | A | F | D | I | G | A | B | D | E | G | H |
| | 408 | F | H | I | C | A | F | D | I | G | A | B | D | E | G | H | B |
| | 409 | H | I | C | A | F | D | I | G | A | B | D | E | G | H | B | C |
| | 410 | I | D | A | G | D | B | G | E | B | H | E | C | H | F | C | I |
| | 411 | D | A | G | D | B | G | E | B | H | E | C | H | F | C | I | F |
| | 412 | I | | | | | | | | | A' | X | D' | X | G' |
| | 413 | | | | | | | | | | A' | X | D' | X | G' | A' |
| | 414 | | | | | | | | | A' | X | D' | X | G' | A' | B' |
| | 415 | | | | | | | | A' | X | D' | X | G' | A' | B' | D' |
| | 416 | | | | | | | A' | X | D' | X | G' | A' | B' | D' | E' |
| | 417 | | | | | | A' | X | D' | X | G' | A' | B' | D' | E' | G' |
| | 418 | | | | | A' | X | D' | X | G' | A' | B' | D' | E' | G' | H' |
| | 419 | | | | A' | X | D' | X | G' | X | B' | X | E' | X | H' | X |

| STEP NO. | MUX 516 OUT | STORAGE ELEMENTS ||||||
|---|---|---|---|---|---|---|---|
| | | 420 | 421 | 422 | 423 | 424 | 425 |
| 24 | γ̇ | | | | | | |
| 25 | γ | γ | | | | | |
| 26 | β̇ | | γ | | | | |
| 27 | β | β | γ | γ | | | |
| 28 | α̇ | | β | γ | | | |
| 29 | | α | | β | γ | | |
| 30 | | | α | β | γ | | −γ |
| 31 | | | | α | β | γ | −γ |
| 32 | | | | α | β | γ | −β |
| 1 | α | | | α | β | γ | −β |
| 2 | −β | | | α | β | γ | −β |
| 3 | α | | | α | β | γ | −β |
| 4 | −β | | | α | β | γ | −β |
| 5 | α | | | α | β | γ | −β |
| 6 | −β | | | α | β | γ | −β |
| 7 | γ | | | γ | α | β | −β |
| 8 | −α | | | γ | α | β | −α |
| 9 | γ | | | γ | α | β | −α |
| 10 | −α | | | γ | α | β | −α |
| 11 | γ | | | γ | α | β | −α |
| 12 | −α | | | γ | α | β | −α |
| 13 | β | | | β | γ | α | −α |
| 14 | −γ | | | β | γ | α | −γ |
| 15 | β | | | β | γ | α | −γ |
| 16 | −γ | | | β | γ | α | −γ |
| 17 | β | | | β | γ | α | −γ |
| 18 | −γ | | | | | | −γ |

INERTIAL TRANSFORMATION MATRIX GENERATOR

The invention was made with government support Contract No. F33657-86-C-2144 awarded by the Department of the Air Force. The government has certain rights in this invention.

FIELD OF THE INVENTION

The invention concerns craft-borne detection systems that provide continually sampled sensor data and that are mounted in fixed position (hard-mounted) on the hull of the host craft and, more particularly, converting all detected data to a common system of spatial coordinates in which craft motion between successive sampling times is compensated for.

BACKGROUND OF THE INVENTION

The inertial frame of reference, to which detections are stabilized, is normally one of the inertial frames used for navigation by the host Inertial Navigation System (INS). One common reference frame is the NED (North, East, Down) reference frame, defined as a local vertical, north referenced coordinate system. The D axis is directed downward, the N axis is orthogonal to the D axis and is directed- North. The E axis is orthogonal to both the N and D axes and is directed East.

The other coordinate frame of reference of interest on a host aircraft is the coordinate frame to which the INS is referenced or aligned. One commonly used reference frame is the body coordinate system (Nose, Rightwing, Down). The x or nose axis points longitudinally through the aircraft along its waterline, the y or rightwing axis is orthogonal to the x axis and is directed out the right wing. The z or down axis is orthogonal to both the x and y axes and is directed out the bottom of the aircraft. While the invention is described particularly in terms of an embodiment used in aircraft, the invention is useful in a number of other types of craft such as landcraft, watercraft, underseacraft and spacecraft.

In the right-hand coordinate system, the Euler transformation matrix $[E\alpha]$ for a rotation through an angle $\alpha$ about the z-axis is as follows:

$$[E_\alpha] = \begin{bmatrix} \cos\alpha & -\sin\alpha & 0 \\ \sin\alpha & \cos\alpha & 0 \\ 0 & 0 & 1 \end{bmatrix} \quad (1)$$

The Euler transformation matrix $[E\beta]$ for a rotation through an angle $\beta$ about the y axis is as follows:

$$[E_\beta] = \begin{bmatrix} \cos\beta & 0 & \sin\beta \\ 0 & 1 & 0 \\ -\sin\beta & 0 & \cos\beta \end{bmatrix} \quad (2)$$

And, the Euler transformation $[EY]$ matrix for a rotation through an angle Y about the x-axis is as follows:

$$[E_\gamma] = \begin{bmatrix} 1 & 0 & 0 \\ 0 & \cos\gamma & -\sin\gamma \\ 0 & \sin\gamma & \cos\gamma \end{bmatrix} \quad (3)$$

If the order of rotation were $\alpha$, $\beta$, and then Y, the total transformation [T] in three dimension would be the product of these three matrices. The order of this multiplication must be preserved.

$$[T] = [E_\alpha][E_\beta][E_\gamma] = \quad (4)$$

$$\begin{bmatrix} (\cos\alpha\cos\beta) & (\cos\alpha\sin\beta\sin\gamma - \sin\alpha\cos\gamma) & -(\cos\alpha\sin\beta\cos\gamma + \sin\alpha\sin\gamma) \\ (\sin\alpha\cos\beta) & (\sin\alpha\sin\beta\sin\gamma + \cos\alpha\cos\gamma) & (\sin\alpha\sin\beta\cos\gamma - \cos\alpha\sin\gamma) \\ -\sin\beta & (\cos\beta\sin\gamma) & (\cos\beta\cos\gamma) \end{bmatrix}$$

Once the angles of rotation between two coordinate systems are known, the transformation of a point in one coordinate system to the other is performed by matrix multiplication. Given two coordinates systems A and B, and knowing the Euler angles from A to B, the transformation of a point x', y', z' in B's frame back to point x, y, z in A's frame is as follows:

$$[E_{AB}] \cdot \begin{bmatrix} x' \\ y' \\ z' \end{bmatrix} = \begin{bmatrix} x \\ y \\ z \end{bmatrix} \quad (5)$$

If there were three coordinate systems, A, B and C, and the Euler transformation matrix $[E_{AB}]$ from A to B and the Euler transformation matrix $[E_{BC}]$ from B to C are known, then it is possible to find the Euler transformation matrix $[E_{AC}]$ from A to C as follows:

$$[E_{AC}] = [E_{AB}] \cdot [E_{BC}] \quad (6)$$

This method can be used to transform data from the sensor coordinate frame of reference to the aircraft frame of reference to the inertial coordinate system frame of reference.

This method can also be used to update the transformation matrix from the sensor coordinate frame to the inertial reference frame. In such case, the Euler matrix $[E_{AB}]$ would be the previous transformation, and the Euler matrix $[E_{BC}]$ would be the incremental transformation. The current transformation would just be the multiplication of the two matrices per equation (6). Over the course of time continual updating of the Euler transformation can be done by matrix multiplying by a succession of incremental transformation matrices in a chain-serial matrix multiplication procedure.

A conventional method used to stabilize detections is to mount the sensor on a stabilized platform. The platform is gimbaled to permit rotations around yaw, pitch and roll axes; and the position of the platform is maintained by three gyros. Electrical outputs of the gyros are proportional to the angles (or rates) through which the gimbals have moved. These gyro angles represent order-dependent rotations about each of the gimbal axes. In other words, these angles represent a rotation about the yaw axis, followed by a rotation about the pitch axis, followed by a rotation around the roll axis. These are the Euler angles of rotation, which can be used to form the Euler transformation matrices.

For practical reasons detection systems often need to be hard-mounted to aircraft hulls as opposed to being mounted on stabilized platforms. Sensor data therefore includes the effects of any aircraft motion. To reduce the system false alarm rate to an acceptable level, potential threats must be tracked in an inertial coordinate system. Effects of aircraft motion must therefore be eliminated from the raw sensor data before tracking can be done. Three rateintegrating gyros located at the sensor and strapped down to the aircraft hull will be able to measure motion caused by aircraft maneuvers as well as motion caused by aircraft vibrations, flexure and turbulence.

The angles measured by the strapped down gyros are not the Euler angles of rotation. In the prior art the Euler angles have been calculated proceeding with three simultaneous differential equations relating the gyro yaw, pitch and roll rates, and changing them to Euler rates. These are then integrated to form Euler angles. Then the Euler angles have been used to form a transformation matrix [T] per equation (4). This involves a large number of calculations.

The invention avoids making so many calculations by deriving an incremental transformation matrix more directly, relying on small angle approximations. A first-order differential equation as set forth in equation (7), following, can be solved to find the transformation matrix T(t).

$$T(t) = T(t)W(t) \tag{7}$$

The transformation matrix T(t), is a function of time, and so is the coefficient matrix W(t). The coefficient matrix W(t) is defined as follows.

$$W(t) = \begin{bmatrix} 0 & -W_\alpha & W_\beta \\ W_\alpha & 0 & -W_\gamma \\ -W_\beta & W_\gamma & 0 \end{bmatrix} \tag{8}$$

The elements of the W matrix are the rates measured by the three gyros.

The solution to the differential equation (7) is $$T(t) = T(t_o)\Phi(t,t_o) \tag{9}$$

where $(t,t_o)$ is the transition matrix associated with the equation, given by $$\Phi(t,t_o) = I + \int_{t_o}^{t} W(\sigma_1) + \int_{t_o}^{t} W(\sigma_1) \int_{t_o}^{\sigma} W(\sigma_2)d\sigma_1 + \ldots \tag{10}$$

(Refer to R.W. Brockett, Finite Dimensional Linear Systems, John Wiley & Sons, N.Y., 1970, pp.19-23).

If $\tau = t - t_o$ is small, i.e., $|\tau| >> 1$, then $W(\sigma)$ is approximately constant for all $t_o \leq \sigma \leq t$. In this case $\phi(t,t_o)$ can be approximated as follows:

$$\Phi(t,t_o) \approx I + \sum_{n=1}^{\infty} W^n(t)(t - t_o)^n/n! \tag{11}$$

Truncating second-order and higher terms, we obtain the following:

$$\Phi(t,t_o) \approx I + W(t)\tau = \begin{bmatrix} 100 \\ 010 \\ 001 \end{bmatrix} + \begin{bmatrix} 0 & -W_\alpha\tau & W_\beta\tau \\ W_\alpha\tau & 0 & -W_\gamma\tau \\ -W_\beta\tau & W_\gamma\tau & 0 \end{bmatrix} = \begin{bmatrix} 1 & -\alpha & \beta \\ \alpha & 1 & -\gamma \\ -\beta & \gamma & 1 \end{bmatrix} \tag{12}$$

where I is the unit matrix and $\alpha,\beta,Y$ are the angles each gyro rotates through during the time $\tau$. Therefore, to update a transformation $T(t_1)$ to $T(t_2)$ where $t_2 - t_1 = \tau$, the following matrix multiplication is performed $$T(t_2) = T(t_1)T \tag{13}$$

where the incremental transformation matrix T is given by $$T = \begin{bmatrix} 1 & -\alpha & \beta \\ \alpha & 1 & -\gamma \\ -\beta & \gamma & 1 \end{bmatrix} \tag{14}$$

SUMMARY OF THE INVENTION

An inertial transformation matrix generator generates a succession of Euler transformation matrices and is useful for converting to inertial coordinates the responses of a craft-borne sensor hard mounted on the hull of the craft. First, second and third rate-sensing gyros are located proximate to said sensor, are strapped down to the craft hull, and are oriented to sense the motion of the craft hull in three mutually orthogonal directions, for providing respective output signals indicative of components of craft hull motion in each of those three mutually orthogonal directions. The output signals of the gyros are digitized and based on these digital signals successive incremental Euler transformation matrices are generated. Each successive incremental Euler transformation matrices and a respective other matrix are multiplied together to generate a respective product matrix, said other matrix initially being an initialization matrix and thereafter being the previously calculated Euler transformation matrix. Each successive current Euler transformation matrix is formed from each successive product matrix, which is done in preferred embodiments of the invention by adding to it at selected times a correction matrix derived by long term comparison of the matrices generated by the inertial transformation matrix generator and the inertial navigation system of the craft.

DETAILED DESCRIPTION OF THE FIGURES

FIG. 3 is a table of control signal values for the FIG. 2 chain-serial matrix multiplier.

Figure 2:
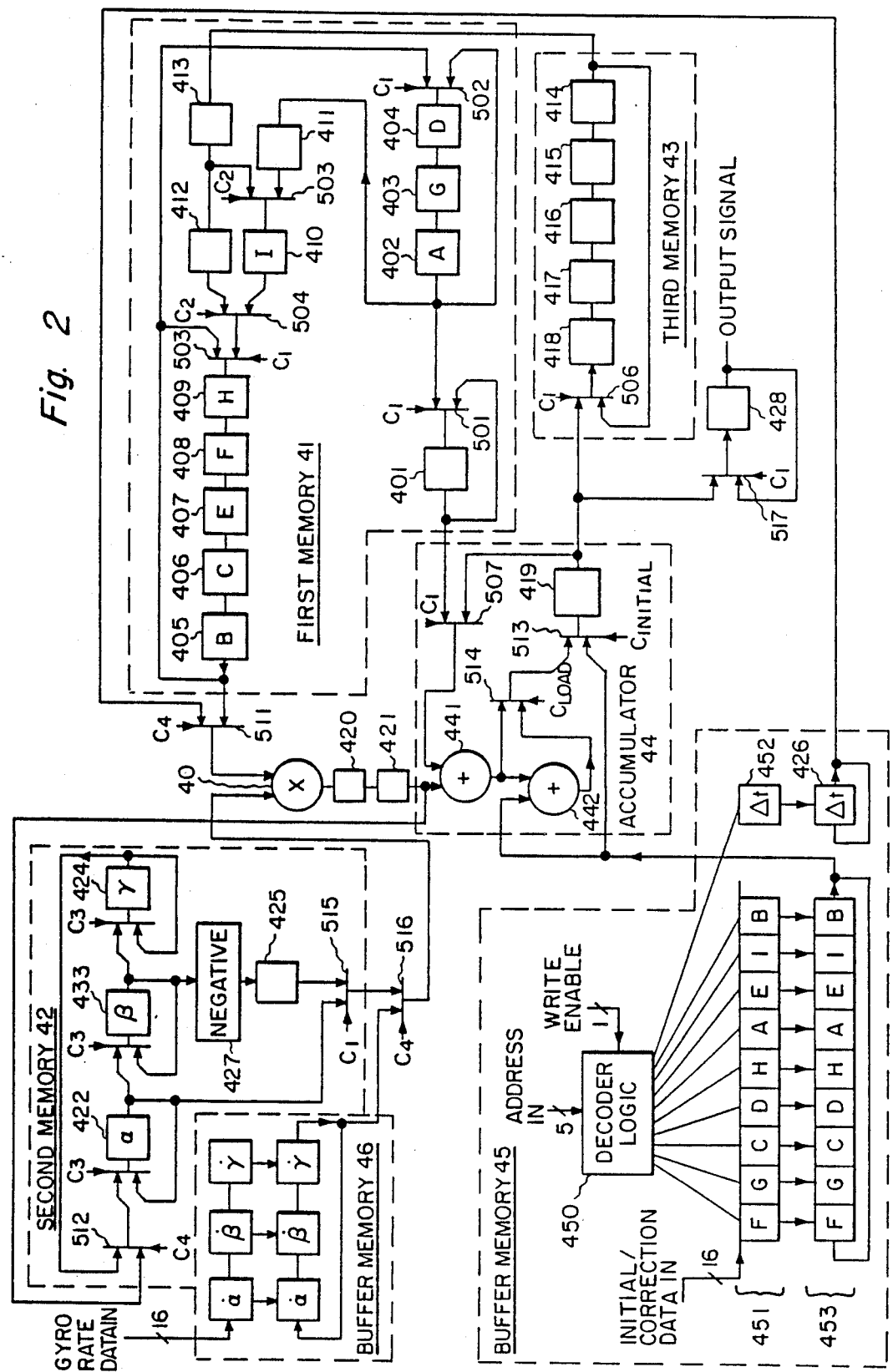
FIG. 2 is a schematic diagram of a chain-matrix multiplier in an inertial transformation matrix generator embodying the invention in a preferred one of its forms.
Figure 4D:
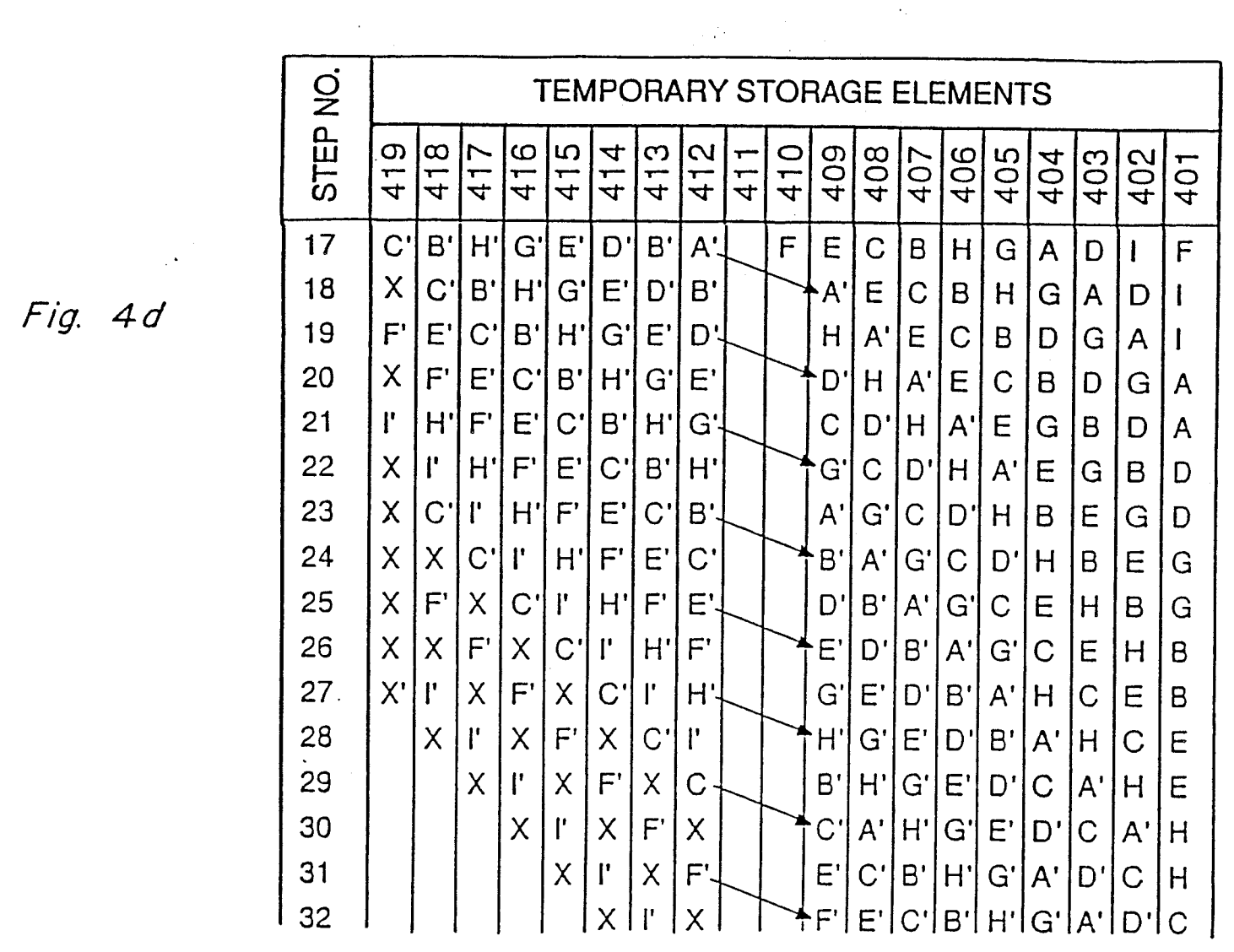

FIG. 4 comprising FIGS. 4a, 4b, 4c and 4d is a table of the contents of storage elements in first and third memories of the FIG. 2 chain-serial matrix multiplier during an initial cycle and a continuing cycle of operation.

FIG. 5 is a table of the contents of other storage elements of the FIG. 2 matrix multiplier (including those in its second memory) during a portion of successive cycles of operation.

Figure 6:
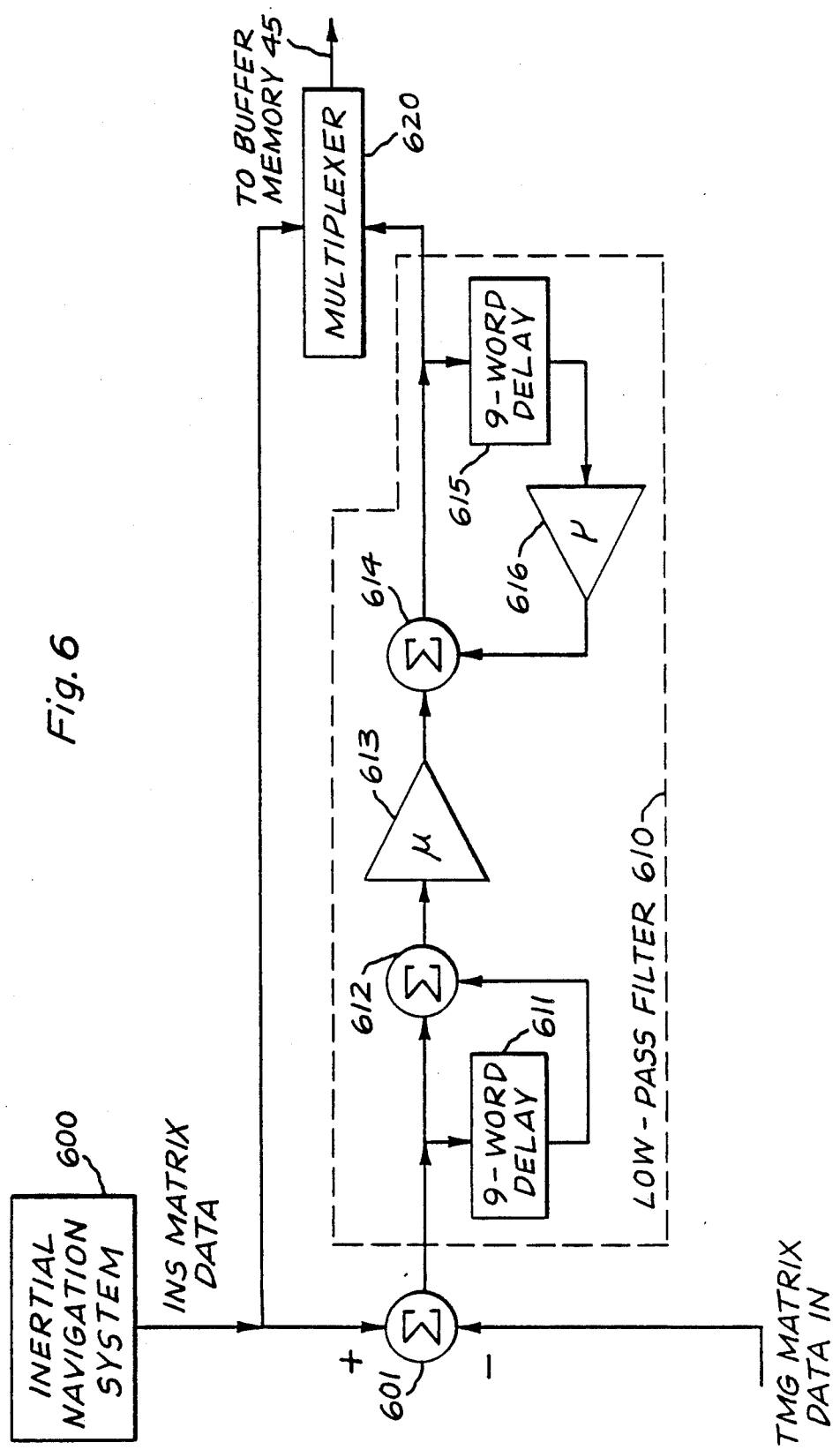

FIG. 6 is a schematic diagram showing connections of the inertial navigation system to the inertial transformation matrix generator for referencing the inertial transformation matrix.

Figure 7:
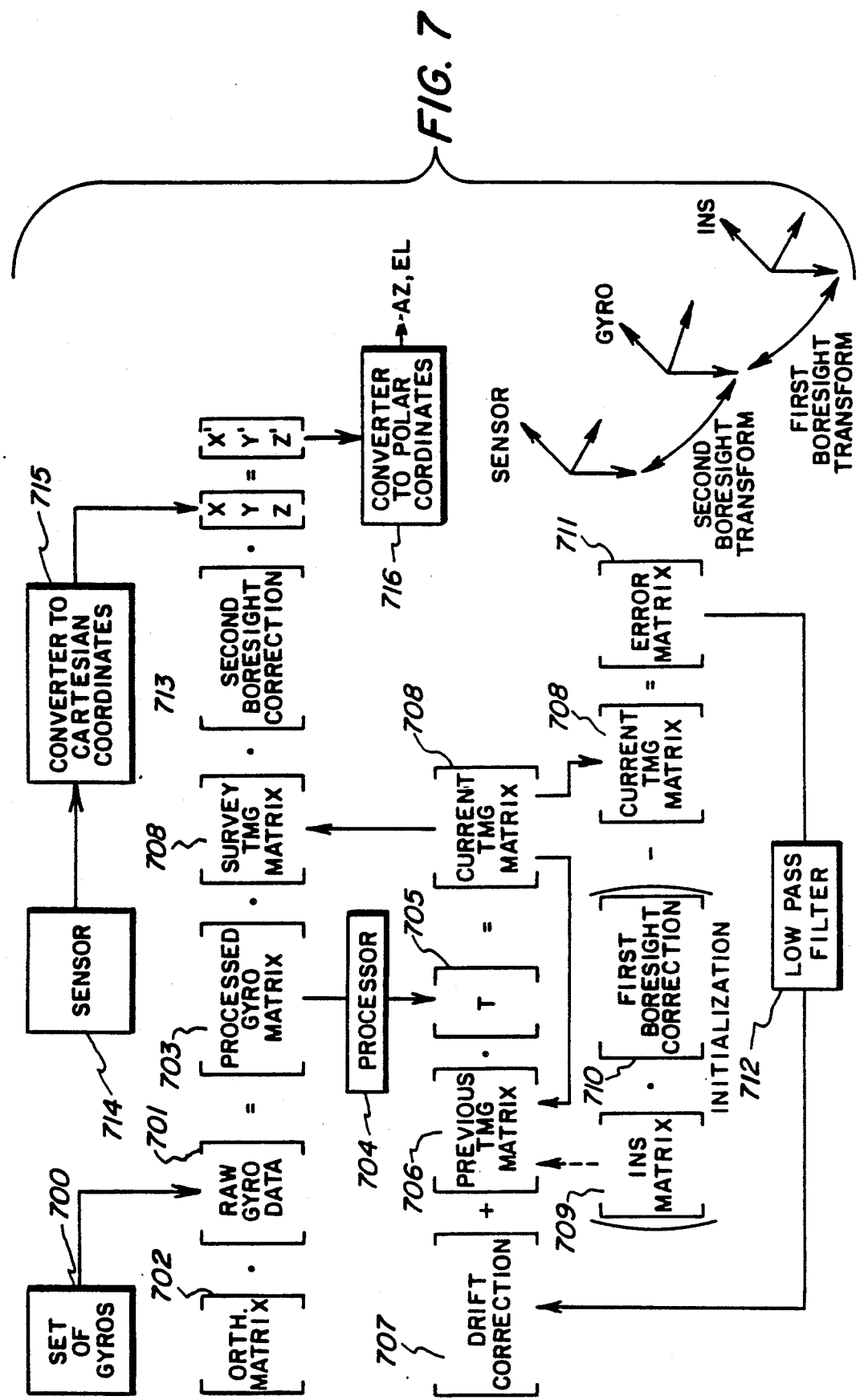

FIG. 7 is a diagram of information processing in a system including the inertial transformation matrix generator of the present invention.

DETAILED DESCRIPTION

Figure 1:
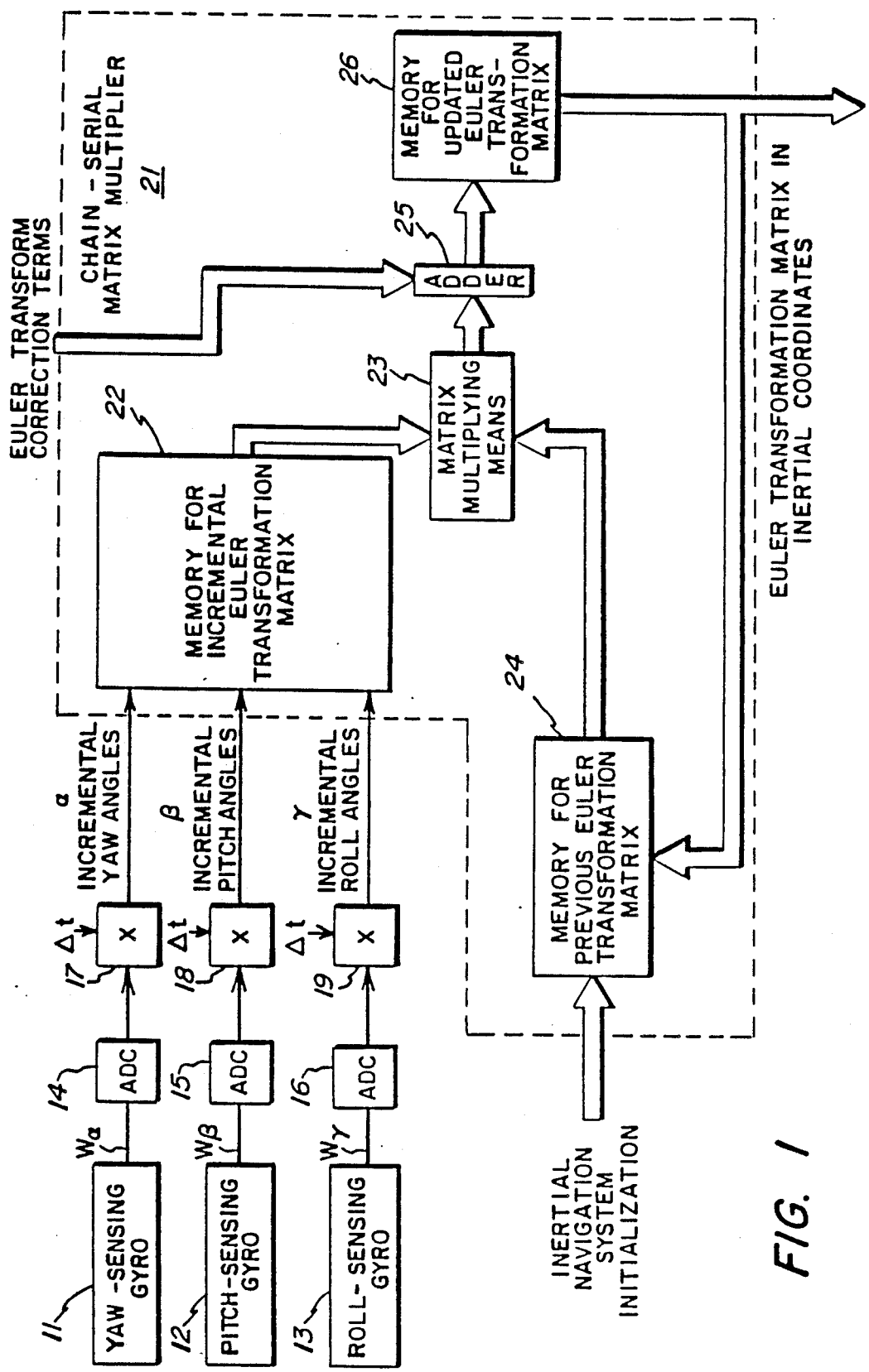
FIG. 1 is a schematic diagram of a system having an inertial transformation matrix generator embodying the invention, for calculating Euler transformation matrices for converting sensor data to inertial coordinates.

FIG. 1 is a conceptual schematic diagram of the inertial transformation matrix generation (TMG) system for generating Euler transformation matrices that are used for transforming the aircraft sensor data to an inertial coordinate system in which the effects of aircraft motion are suppressed. A yaw sensing gyro 11 generates rate of yaw angle change information $W_\alpha$ in analog form, which is converted to digital form by an analog-to-digital converter 14 and then is supplied to a digital multiplier 17, there to be multiplied by an increment of time $\Delta t$ to generate a stream of $\alpha$ incremental yaw angles. A pitch-sensing gyro 12 generates rate of pitch angle change information $W\beta$ in analog form which is converted to digital form by an analog-to-digital converter 15 and is then supplied to a digital multiplier 18, there to be multiplied by $\Delta t$ to generate a stream of $\beta$ incremental pitch angles. A roll-sensing gyro 13 generates rate of roll WY in analog form, which is converted to digital form by an analog-to-digital converter 16 and is then supplied to a digital multiplier 19, there to be multiplied by $\Delta t$ to generate a stream of Y incremental roll angles. The $\alpha$, $\beta$ and Y incremental angles are used to define the incremental Euler transformation matrix T of matrix equation (14), and a chain-serial matrix multiplier 21 uses a succession of these matrices to generate a succession of updated Euler transformation matrices per matrix equation (13).

Chain-serial matrix multiplier 21 includes elements 22–26. Memory 22 stores incremental Euler transformation matrices and is written in accordance with the $\alpha$, $\beta$ and Y incremental Euler angles generated by multiplying analog-to-digital converters 17, 18 and 19. The previous Euler transformation matrix as read from memory 24 is multiplied in matrix multiplying means 23 by each successive one of these matrices to generate an updated Euler transformation matrix which is periodically corrected by adding correction terms in adder 25. The corrected updated Euler transformation matrix is temporarily stored in a memory 26 and is subsequently used for writing over memory 24. The initial Euler transformation matrix in memory 24 is supplied from the inertial navigation system.

TMG system corrections for long-term drift between Euler transformation matrix generator and the inertial navigation system (INS) are made in the FIG. 1 system by adding corrections to transformation matrix correction terms periodically using an adder 25, located after matrix multiplying means 23, the correction loop. The Euler transformation correction terms supplied to adder 25 are an error signal matrix generated by taking the Euler transform, as supplied from memory 24 in inertial transformation matrix generation (TMG) system, integrating it over time to suppress higher-frequency terms arising from vibration and airframe flexure so it is responsive only to low-frequency motion of the aircraft, and comparing it to the inertial navigation system (INS) transform which is also responsive only to low-frequency motion of the aircraft. Comparison is accomplished by matrix subtraction.

There are at least four sources of error that afflict the transformation matrix generator and should be compensated for, which errors are listed in the following four paragraphs:

(1) The gyro axes are not exactly mutually perpendicular, introducing error into the Euler transformation matrix. This error can be avoided by careful mechanical adjustments, but it may be more practical to provide for making an electrical correction. This error is a static error and is best compensated for by introducing a step of matrix multiplication by a fixed-value correction matrix. This correction, described in detail further on in this specification, is not shown in the FIG. 1 system diagram.

(2) The angles $\alpha,\beta$ and Y are approximated by products of gyro rate times a time increment, i.e., $\alpha = W_\alpha \tau$, $\beta = W_\beta \tau$, $\alpha = W_Y \tau$. This gives the correct angle only if the rate is constant over the time interval $\tau$. Otherwise, an error in angle results, which is accumulated by the updating process.

(3) The incremental transformation matrix is not a true Euler transformation matrix, but only becomes one as $\alpha,\beta$ and Y each approach zero. For nonzero values of $\alpha,\beta$ and Y, there is an approximation error which makes the matrix nonunitary. The Euler transformation matrix for transforming coordinates from one reference to a rotated one is by definition unitary—that is, the matrix products of itself multiplied by its transpose and of its transpose multiplied by itself are equal to each other and to the unit matrix of similar order. This unit matrix is the square matrix $I = (\delta_{ij})$ where each matrix element $\delta_{ij}$ in row i and column j has a value equal to unity for $i = j$ and otherwise equal to zero. The product of unitary matrices is unitary. So, theoretically, updating a Euler transformation matrix by multiplying it by successive incremental Euler transformation matrices should always result in a unitary matrix, presuming all matrices multiplied together have been unitary. However, in the transform matrix generator the incremental transformation matrix being per equation (13), the product of itself [T] and its transpose $[T]^T$ takes the following form:

$$[T] \cdot [T]^T = \begin{bmatrix} 1 + \alpha^2 + \beta^2 & -\beta\gamma & -\alpha\gamma \\ -\beta\gamma & 1 + \alpha^2 + \gamma^2 & -\alpha\beta \\ -\alpha\gamma & -\alpha\beta & 1 + \beta^2 + \gamma^2 \end{bmatrix} \quad (15)$$

Therefore T is only approximately unitary, the approximation being better the smaller $\alpha,\beta$ and Y are. So with more violent maneuvering of the aircraft and the attendant larger values of $\alpha,\beta$ and Y the more quickly the updating procedure will cause an initially unitary Euler transformation matrix to depart from being unitary.

(4) Each matrix multiplication introduces finite-wordlength arithmetic errors, which also accumulate from update step to update step. These errors accumulate more rapidly if the multiplication is done only with single precision (retaining the major product and suppressing the minor product), rather than with double precision (retaining both major and minor products in an accumulator with extended number of bits). Simply truncating the product to the major product, rather than following a rounding procedure, causes the errors to accumulate more rapidly.

An original TMG constructed in accordance with the invention corrected the angles $\alpha, \beta$, and Y directly, based on estimated errors obtained by comparing TMG generated and INS generated matrices. The inverse of one of these matrices was matrix multiplied by the other to develop a product matrix having sin $\alpha$, sin $\beta$ and sin Y terms as elements thereof. These terms approximated as small angles represent the angular errors between the TMG generated and INS generated matrices. These deviations are low-pass filtered to generate the correction terms for the Euler angles $\alpha, \beta$ and Y. Errors were reasonably small as long as $\alpha, \beta$ and Y were small enough so that their squared values are less than one least significant bit of the system word length. Larger values of $\alpha, \beta$ and Y can lead to non-unitary and non-orthogonality errors if care is not taken when choosing gyro A/D scaling and TMG sample rates. In the original TMG, errors from the third-listed source were controlled by using a long wordlength, full-precision (or double-precision) multiplication with rounding, which entailed accumulation of double-length words.

In the FIG. 1 correction scheme, the angles $\alpha, \beta$ and Y are not corrected directly. Rather, the entire transformation matrix is corrected entry by entry using a closed-loop error feedback correction mechanism. This corrects for all four of the listed sources of error. The correction system keeps nudging the transformation matrix back to being unitary no matter how large $\alpha, \beta$ and Y get. Furthermore, single-precision multiplication, using truncation rather than rounding to provide arithmetic quantization, can be used without the problem of runaway accumulation of multiplier errors.

Chain-serial matrix multiplier 21 may be one that uses a plurality of digital multipliers to perform element by element multiplications in parallel. Inventors D.S. Chan and D.A. Staver in their patent application Ser. No. 401,581 filed 31 Aug. 1989, entitled "CHAIN-SERIAL MATRIX MULTIPLIERS" and assigned to General Electric Company describe general-purpose chain serial matrix multipliers as may be used for chain-serial matrix multiplier 21, in which a single digital multiplier is used on a time-division-multiplex basis to perform all element by element multiplications. Rather than using a general-purpose third-order matrix multiplier 21, a special-purpose third-order matrix multiplier, as also described in the concurrently filed application, is preferred for performing chain-serial matrix multiplication for the FIG. 1 system.

FIG. 2 is a schematic diagram of this special-purpose chain-serial matrix multiplier for the FIG. 1 system. FIG. 3 is a table of the control signals used in the FIG. 2 matrix multiplier. FIG. 4 comprised of FIGS. 4a, 4b, 4c and 4d is a table describing the contents of temporary storage elements 401–419 in a first memory 41 and a third memory 43 of the FIG. 2 matrix multiplier during its continuing operation. FIG. 5 is a table describing the contents of temporary storage elements in a second memory 42 of the FIG. 2 matrix multiplier and of temporary storage elements between a multiplier 40 in FIG. 2 matrix multiplier and its second memory 42 during integration of gyro rate information. Multiplier 40 and ensuing sample-word-interval delay elements 420 and 421 are the equivalent of an actual pipeline multiplier having a two-word delay in generating major product.

One of the design goals for the FIG. 2 matrix multiplier was to develop most of the control signals using a simple binary counter. Accordingly, as can be discerned from the FIG. 3 table of control signals, a 32-step operating cycle is used. Control signal $C_1$ and $C_2$ can be provided by the least significant bit and the most significant bit, respectively, of the count output signal of a five-stage binary up counter. Control signal $C_4$ can be simply generated by ANDing the most significant bit and the next most significant bit of the count output signal of the five-stage counter. Control signal $C_3$ can be generated by decoding the six and twelve counts from the binary counter and ORing the decoder output signals with control signal $C_4$. During the 32 step operating cycle a single digital multiplier 40 in the FIG. 2 matrix multiplier is used on a time-division-multiplexed basis both to integrate the gyro rate information and to perform the multiplications associated with the matrix multiplication for updating the third-order Euler transformation matrix. The integration of gyro rate information takes place in steps 25–32 of the operating cycle.

The elements of a preceding Euler matrix [E(t)] are defined as A, B, C, D, E, F, G, H, I, and each step of the chain-serial matrix multiplication to establish the current Euler matrix [E(t+$\Delta$t)] should be as follows:

$$[E(t + Dt)] = [E(t)] \cdot [T] = \begin{bmatrix} A & B & C \\ D & E & F \\ G & H & I \end{bmatrix} \cdot \begin{bmatrix} 1 & -\alpha & \beta \\ \alpha & 1 & -\gamma \\ -\beta & \gamma & 1 \end{bmatrix} \quad (14)$$

This chain-serial matrix multiplication is carried out during steps 1–18 of the operating cycle, with two steps of the operating cycle being taken up with generating each element of the new matrix, rather than three as chain-serial matrix multiplier. This is possible because the multiplications by unity-valued elements in the matrix [T] need not be carried out by the single digital multiplier 40. Rather, an element to be multiplied by such unity-valued element defines the product of such multiplication and is directly routed to an accumulator 44 following multiplier 40, rather than using multiplier 40 to perform these trivial "multiplications" on a pro forma basis.

The multiplicand matrix is scanned in row major order once, multiplying the successive elements in each row by 1, $\alpha$ and $-\beta$ respectively of a column vector of the multiplier matrix. One could arrange to rescan the multiplicand matrix in row major order twice again, multiplying the successive elements in each row by the column vector $-\alpha$, 1 and Y respectively in the first rescanning and by the column vector $\beta$, $-\alpha$ and 1 respectively in the second rescanning. Rather than doing this, steps are taken to multiply the elements in the multiplicand matrix by the barrel-shifted column vector 1, Y and $-\alpha$ and then by the barrel-shifted column vector 1, $\beta$ and $-$Y. This is made possible by providing compensatory barrel shifts in the positions of elements in the rows of the multiplicand matrix between each scanning in row major order and by considering the product matrix also to have corresponding barre shifts in the positions of elements in its rows. These barrel shifts of elements in the columns of the multiplier matrix and in the rows of the multiplicand and product matrices are implementable using serial memories. When a complete matrix multiplication has been carried out, the three successive barrel shifts of elements in the rows of the product matrix during the matrix multiplication has restored the original positions of these elements.

The initial loading of temporary sample storage elements 401–413 in first memory 41 of the FIG. 2 matrix multiplier is made via the serial third memory 43 comprising temporary sample storage elements 412–418 and multiplexer 506, and via a temporary sample storage element 419 and a multiplexer 513 in an accumulator 44. FIGS. 4a and 4b are tables of temporary sample storage element conditions that obtain in the first and second halves respectively at the initial 32-step cycle of operation, during which this initial loading is done. Control signal $C_{INITIAL}$ applied to the multiplexer 513 is high the first twenty-one steps of the first 32-step operating cycle, conditioning multiplexer 513 to load the A-I elements of the initial multiplicand matrix from a double-buffer random-access memory 45.

RAM 45 includes parallel load registers 451 into respective ones of which initial data samples A-I are asynchronously loaded, as shown, under control of decoder logic 450. RAM 45 also includes a parallel load register 452 into which $\Delta t$ samples are asynchronously loaded, again under control of decoder logic 450. RAM 45 includes parallel-to-serial registers 453 to which the A-I initial data samples are parallelly loaded, which registers 453 are synchronously operated and connected to provide serial memory. RAM 45 also includes a register 426 connected to receive successive $\Delta t$ samples and recirculate each of them in a synchronous serial memory operation. As will be described later on, registers 451 and 453 are also used to store correction data temporarily until such time as it is admitted into accumulator 44.

RAM 45 has previously stored initialization data furnished from the inertial navigation system and no supplies them in the successive order XXXAXDXGXDXEXHXCXFXI during steps 1–21 of the initial 32-step operating cycle. After three don't-care samples, this sequence is the matrix samples in column major order alternating with don't care samples, the don't care values being indicated by X's. The one-sample delay afforded by temporary storage element 419 causes the alternate samples A, D, G, B, E, H, C, F AND I to be supplied to the input port of multiplexer 506 selected during odd-numbered steps for supplying signal to cascaded temporary sample storage elements 418, 417, 416, 415, 414 in the third memory 43. After that one passage through the cascaded temporary storage elements in third memory 43 the alternate samples are, however, fed back to the input port of multiplexer 506 selected during even-numbered steps for supplying signal to the cascaded storage elements 418, 417, 416, 415, 414 of third memory 43, to time interleave with thé-ir successors. After one passage through the cascaded temporary storage elements in third memory 43, the alternate samples are delayed an additional sample interval in each of the cascaded temporary sample storage elements 413 and 412 to arrive at input ports of multiplexers 505 and 504 not selected for connection to their output ports at the time those samples arrive. After that one passage through the cascaded temporary storage elements in third memory 43 the alternate samples are, however, fed back to the input port of multiplexer 506 selected during even-numbered steps for supplying signal to the cascaded storage elements 418, 417, 416, 415, 414 of third memory 43, to time interleave with their successors.

After the second passage of these alternate samples through the cascaded temporary storage elements in third memory 43 to time interleave with the other initial samples and after one sample further delay in a clocked temporary storage element 413 these initial samples arrive at the input port of a multiplexer 505 selected at those times for connection to its output ports. The initial samples routed through multiplexer 505 to a clocked temporary storage element 410 are except for the final sample not selected by a multiplexer 504 for connection to its output port. The initial samples, after an additional sample delay in a clocked temporary sample storage element 412, arrive at the input port of multiplexer 504 selected to its output port during all the initial samples except the last I sample.

A multiplexer 503 selects to its output port only during odd-numbered steps of the operating cycle its input port connected from the output port of multiplexer 504, so initial samples flow through multiplexer 504 to the cascaded temporary sample storage elements 409, 408, 407, 406 and 405 only after these samples have completed one recirculation through the serial third memory 43 so they reach multiplexer 503 on an odd-numbered step of the operating cycle. Similarly, a multiplexer 502 selects samples supplied from one-sample-delay clocked temporary sample storage element 405 only during odd-numbered steps of the operating cycle, so only initial samples recirculated through cascaded temporary storage elements 409, 408, 407, 406 and 405 are applied to cascaded clocked temporary storage elements 404, 403 and 402. Again similarly, a multiplexer 501 selects samples supplied from temporary storage element 402 only during odd-numbered steps of the operating cycle, which causes each successive sample so selected to appear twice in succession as applied to accumulator 430.

After the first twenty-one steps of the first 32-step operating cycle, the control signal $C_{INITIAL}$ is low. So third memory 43 is loaded during successive operating cycles using updated matrix elements as accumulated by accumulator 44. Insofar as the third memory 43 and first memory 41 are concerned, loading of updated matrix elements takes place in these successive operating cycles much the same as loading of initial matrix elements takes place in the first operating cycle.

Beginning with the twenty-fifth step of each operating cycle and continuing through its last step, the matrix elements to be temporarily stored in second memory 42 for use in the next 32-step operating cycle are generated. A multiplication factor, $\Delta t$, is loaded into temporary storage element 426 within the buffer RAM 45 during the twenty-fifth step and control signal $C_4$ applied to multiplexer 511 is high, conditioning multiplexer 511 to apply $\Delta t$ (recirculated in temporary storage element 426) to multiplier 40 as multiplicand signal during steps 25–32. A multiplexer 516 is conditioned by $C_4$ being high to select to multiplier 40 as multiplier signal read-out from a double-buffer random-access memory 46 during steps 25–32. The $\alpha$, $\beta$ and Y elements for the Euler transformation matrix are delivered from multiplier 40 as products via the cascade connection of temporary storage elements 420 and 421 during steps 28–30.

During steps 25–32, control signal $C_4$ applied to multiplexer 512 is high, and control signal $C_3$ applied to multiplexers 508, 509 and 510 is high. Accordingly, multiplexers 508–510 and 512 are conditioned to include temporary sample storage elements 422, 423 and 424 in cascade connection with temporary storage elements 420 and 421. This permits the $\alpha$, $\beta$ and Y products to be shifted to positions in temporary storage elements 424, 423 and 422, respectively, for the beginning of the next operating cycle. A temporary sample storage element 425 receives as input signal the negative of the output signal from temporary storage element 423, as generated by elements 427, and so stores $-\beta$ product as the beginning of the next operating cycle.

FIGS. 4c and 4d show the samples stored in temporary storage elements 401–419 during each step of the first and second halves respectively of this next operating cycle. The matrix elements stored in temporary storage elements 402–409 at the beginning of this operating cycle are shown in the blocks representing these elements in FIG. 2. Updated matrix element A' that replaces the original matrix element A is calculated by inserting samples B and C into multiplier 40 following the first and second steps, respectively, to be multiplied by $\alpha$ and $-\beta$ values, respectively. The major products of these multiplications are delayed one clock cycle to be clocked into temporary storage element 420 following the second and third steps and then into temporary storage element 421 following the third and fourth steps. Following the third step, adder 441 in the accumulator 440 receives as a first input signal the A sample from storage element 401, as selected by multiplexer 507 responding to control signal $C_1$ being high, and receives as a second signal the delayed product $\alpha B$ from storage element 421. The sum output signal from adder 441 is inserted into storage element 419. Following any even-numbered step, control signal $C_1$ is low, conditioning multiplexer 506 in third memory 43 to continue circulating samples already contained therein, rather than accepting a new sample being written thereinto. So, following the fourth step, adder 441 receives as a first input signal the sum output signal temporarily stored in storage element 419, as selected by multiplexer 507 responding to control signal $C_1$ being low. Adder 441 receives as its second input signal the delayed product $-\beta C$ from storage element 421. Adder 441 delivers its sum output signal to storage element 419. Following the fifth step (or any odd-numbered step) control signal $C_1$ applied to multiplexer 506 is high, conditioning it to write the accumulation result temporarily stored in storage element 419 into the serial third memory 43. So the accumulation result $A' = A + \alpha B - \beta C$ is transferred from temporary storage element 419 to temporary storage element 420 between the fifth and sixth steps of the operating cycle.

During the third step samples E and F have advanced to storage elements 405 and 406, and sample D has advanced to storage element 402. Samples E and F enter multiplier 40 following the third and fourth steps, respectively, to be multiplied by $\alpha$ and $-\beta$ values respectively. The major products of these multiplications are delayed by one clock cycle to be clocked into storage element 420 following the fourth and fifth steps and then into temporary storage element 421 following the fifth and sixth steps. Following the third step, multiplexer 501 responding to control signal $C_1$ being high writes sample D into storage element 401. Following the fourth step, multiplexer 501 responding to control signal $C_1$ being low reads D sample to rewrite storage element 401. Following the fifth step, adder 441 receives via multiplexer 507 sample D from storage element 401 as one input signal and receives the delayed product $\alpha E$ from storage element 421 as its other input signal. Multiplexer 507 operates to circulate the sum signal inserted from adder 441 into storage element 419 back to adder 441 following the sixth step, to be added with the delayed product $-\beta F$ read from storage element 421. Following the seventh step multiplexer 506 writes into third memory 43 the accumulation result $D' = D + \alpha E - \beta F$ until then temporarily stored in storage element 419.

During the fifth step, samples H and I have advanced to storage elements 405 and 406, and sample G has advanced to storage element 402. Samples H and I enter multiplier 40 following the third and fourth steps, respectively, to be multiplied by $\alpha$ and $-\beta$ values respectively. The major products of these multiplications are delayed by one clock cycle to be clocked into storage element 420 following the sixth and seventh steps and then into temporary storage element 421 following the seventh and eighth steps. Following the fifth step, multiplexer 501 responding to control signal $C_1$ being high writes sample G into storage element 401. Following the sixth step, multiplexer 501 responding to control signal $C_1$ being low reads sample G to rewrite storage element 401. Following the seventh step, adder 441 receives via multiplexer 507 sample G from storage element 401 as one input signal and receives the delayed product $\alpha H$ from storage element 421 as its other input signal. Multiplexer 507 operates to circulate the sum signal inserted from adder 441 into storage element 419 back to adder 431 following the eighth step, to be added with the delayed product $-\beta I$ read from storage element 421. Following the ninth step multiplexer 506 writes into third memory 43 the accumulation result $G' = G + \alpha H - \beta I$ until then temporarily stored in storage element 419.

As one may note from referring to FIG. 5 table of temporary storage element conditions in second memory 42, control signal $C_3$ being high during the sixth step causes circulation of elements Y, $\alpha$ and $\beta$ from temporary storage elements 422, 423 and 424, respectively to temporary storage elements 423, 424 and 422, respectively, following the twelfth step, to repose therein through the eighteenth step. Following the seventh step the negative of the value $\alpha$ that is stored in storage element 413 is written into storage element 425, to repose therein through the twelfth step.

During the seventh step, samples C and A have advanced to storage elements 405 and 406, and sample D has advanced to storage element 402. Samples C and A enter multiplier 40 following the seventh and eighth steps, respectively to be multiplied by Y and $-\alpha$ values respectively. The major products of these multiplications are delayed by one clock cycle to be clocked into storage element 420 following the eighth and ninth steps and then into temporary storage element 421 following the ninth and tenth steps. Following the seventh step, multiplexer 501 responding to control signal $C_1$ being high writes sample B into storage element 401 as A sample is read out. Following the eighth step, multiplexer 501 responding to control signal $C_1$ being low reads sample B to rewrite storage element 401. Following the ninth step, adder 441 receives via multiplexer 507 sample B from storage element 401 as one input signal and receives the delayed product YC from storage element 421 as its other input signal. Multiplexer 507 operates to circulate the sum signal inserted from adder 441 into storage element 419 back to adder 441 following the tenth step, to be added with the delayed product $-\alpha A$ read from storage element 421. Following the eleventh step multiplexer 506 writes into third memory 43 the accumulation $B' = B + YC - \alpha A$ until then temporarily stored in storage element 419.

During the ninth step, samples F and D have advanced to storage elements 405 and 406, and sample E has advanced to storage element 402. Samples F and D enter multiplier 40 following the ninth and tenth steps, respectively to be multiplied by Y and $\alpha$ values respectively. The major products of these multiplications are delayed by one clock cycle to be clocked into storage element 420 following the tenth and eleventh steps and then into temporary storage element 421 following the eleventh and twelfth steps. Following the ninth step, multiplexer 501 responding to control signal $C_1$ being high writes sample E into storage element 401. Following the tenth step, multiplexer 501 responding to control signal $C_1$ being low reads sample E to rewrite storage element 401. Following the eleventh step, adder 441 receives via multiplexer 507 sample E from storage element 401 as one input signal and receives the delayed product YF from storage element 421 as its other input signal. Multiplexer 507 operates to circulate the sum signal inserted from adder 441 into storage element 419 back to adder 441 following the twelfth step, to be added with the delayed product $-\alpha D$ read from storage element 421. Following the thirteenth step multiplexer 506 writes into third memory 3 the accumulation $E' = E + YF - \alpha D$ until then temporarily stored in storage element 419.

During the eleventh step samples I and G have advanced to storage elements 405 and 406, and sample D has advanced to storage element 402. Samples I and G enter multiplier 40 following the eleventh and twelfth steps, respectively to be multiplied by Y and $-\alpha$ values respectively. The major products of these multiplications are delayed by one clock cycle to be clocked into storage element 420 following the twelfth and thirteenth steps and then into temporary storage element 421 following the thirteenth and fourteenth steps. Following the eleventh step, multiplexer 501 responding to control signal $C_1$ being high writes sample H into storage element 401. Following the twelfth step, multiplexer 501 responding to control signal $C_1$ being low reads sample H to rewrite storage element 401. Following the thirteenth step, adder 441 receives via multiplexer 507 sample H from storage element 401 as one input signal and receives the delayed product YI from storage element 421 as its other input signal. Multiplexer 507 operates to circulate the sum signal inserted from adder 441 into storage element 419 back to adder 441 following the sixth step, to be added with the delayed product $-\alpha G$ read from storage element 421. Following the seventh step multiplexer 506 writes into third memory the accumulation result $H' = H + \alpha I - YG$ temporarily stored in storage element 419.

As one may note from referring to FIG. 5 table of temporary storage element conditions in second memory 42, control signal $C_3$ being high during the twelfth step causes circulation of elements Y, $\alpha$ and $\beta$ from temporary storage elements 422, 423 and 424, respectively, to temporary storage elements 423, 424 and 422, respectively, following the twelfth step, to repose therein through the eighteenth step. Following the thirteenth step the negative of the value Y that is stored in storage element 423 is written into storage element 425, to repose therein through the eighteenth step.

During the thirteenth step samples A and B have advanced to storage elements 405 and 406, and sample C has advanced to storage element 402. Samples A and B enter multiplier 40 following the thirteenth and fourteenth steps, respectively to be multiplied by Y and $-\alpha$ values respectively. The major products of these multiplications are delayed by one clock cycle to be clocked into storage element 420 following the fourteenth and fifteenth steps and then into temporary storage element 421 following the fifteenth and sixteenth steps. Following the third step, multiplexer 501 responding to control signal $C_1$ being high writes sample C into storage element 401 Following the fourteenth step, multiplexer 501 responding to control signal $C_1$ being low reads D sample to rewrite storage element 401. Following the fifteenth step, adder 441 receives via multiplexer 507 sample C from storage element 401 as one input signal and receives the delayed product $\beta A$ from storage element 421 as its other input signal. Multiplexer 507 operates to circulate the sum signal inserted from adder 441 into storage element 419 back to adder 441 following the sixteenth step, to be added with the delayed product $-YB$ read from storage element 421. Following the seventeenth step multiplexer 506 writes into third memory 43 the accumulation result $C' = C + \beta A - YB$ until then temporarily stored in storage element 419.

During the fifteenth step samples D and E have advanced to storage elements 405 and 406, and sample F has advanced to storage element 402. Samples D and E enter multiplier 40 following the fifteenth and sixteenth steps, respectively to be multiplied by $\beta$ and $-Y$ values respectively. The major products of these multiplications are delayed by one clock cycle to be clocked into storage element 420 following the sixteenth and seventeenth steps and then into temporary storage element 421 following the seventeenth and eighteenth steps. Following the fifteenth step, multiplexer 501 responding to control signal $C_1$ being high writes sample F into storage element 401 out. Following the sixteenth step, multiplexer 501 responding to control signal $C_1$ being low reads sample F to rewrite storage element 401. Following the seventeenth step, adder 441 receives via multiplexer 507 sample F from storage element 401 as one input signal and receives the delayed product $\beta D$ from storage element 421 as its other input signal. Multiplexer 507 operates to circulate the sum signal inserted from adder 441 into storage element 419 back to adder 441 following the eighteenth step, to be added with the delayed product $-YE$ read from storage element 421. Following the nineteenth step multiplexer 506 writes into third memory 43 the accumulation result $F' = F + \beta D - YE$ temporarily stored in storage element 419.

During the seventeenth step samples G and H have advanced to storage elements 405 and 406, and sample I has advanced to storage element 402. Samples G and H enter multiplier 40 following the seventeenth and eighteenth steps, respectively to be multiplied by $\beta$ and $-Y$ values respectively. The major products of these multiplications are delayed by one clock cycle to be clocked into storage element 420 following the eighteenth and nineteenth steps and then into temporary storage element 421 following the nineteenth and twentieth steps. Following the seventeenth step, multiplexer 501 responding to control signal $C_1$ being high writes sample I into storage element 401. Following the eighteenth step, multiplexer 501 responding to control signal $C_1$ being low reads sample I to rewrite storage element 401. Following the nineteenth step, adder 441 receives via multiplexer 507 sample I from storage element 401 as one input signal and receives the delayed product $\beta G$ from storage element 421 as its other input signal. Multiplexer 507 operates to circulate the sum signal inserted from adder 441 into storage element 419 back to adder 441 following the sixth step, to be added with the delayed product −YH read from storage element 421. Following the twenty-first step multiplexer 506 writes into third memory 43 the accumulation result I'−=I+βG−YH until then temporarily stored in storage element 419.

During the operations just described a multiplicand matrix element clocked out of temporary storage element 405 after being available as an input signal to multiplier 40 during an odd-numbered step of the operating cycle will not be recirculated to element 409 by reason of multiplexer 503 being conditioned by control signal $C_1$ being low to instead admit a new matrix element. $C_2$ is low during steps 1–16 of the operating cycle, conditioning multiplexers 504 and 505 to connect temporary storage element 410 in cascade connection after temporary storage elements 404–403, 402 and 411. Following step 1, sample I is clocked forward into storage element 409. The sample clocked out of storage element 405 after an odd-numbered step of the operating cycle is selected to storage element 404 by multiplexer 502 responding to $C_1$ having been high during the odd-numbered step. A multiplicand matrix element clocked out of storage element 405 during an even-numbered step of the operating cycle is selected back to storage element 409 by multiplexer 503 responding to control signal $C_1$ being low. Similarly, a multiplicand matrix element clocked out of storage element 402 during an even-numbered step of the operating cycle is selected back to storage element 404 by multiplexer 502 responding to control signal $C_1$ being low. The sample is thus preserved in the cascade connection of storage elements 404, 403, 402 even though that sample as it proceeds following the even-numbered step to storage element 411 will after being clocked through storage element 412 not be selected to storage element 409 but rather discarded by action of multiplexer 503.

Output signal is shown in FIG. 2 as being taken from the output of accumulator 44 and having some of the nonuseful samples replaced with repeated useful samples. This replacement is done by a multiplexer 517 responding to control signal $C_1$ a temporary storage element 428 connected as a further serial memory. Alternately, output signal can be taken from the output port of any of the storage elements 413–418.

The FIG. 2 chain-serial matrix multiplier is adapted for entering inertial navigation system corrections at selected times using a further adder 442 in accumulator 44 Responsive to the normally low control signal $C_{LOAD}$ being high at appropriate times adder 441 output signals with corrections added to them in adder 442 are selected to third memory, 43 rather than adder 441 output signals without such corrections. These corrections are delivered from the same buffer RAM 45 used to load initial matrix data.

As previously noted, these corrections correspond to the difference between the low-pass filtered inertial successive transformation matrices and the low-pass filtered successive inertial navigation system INS matrices. The low-pass filtering of a succession of matrices is a way of determining their average value over a period of time. Subtracting the average value of one succession of matrices from the average of another succession of matrices is a comparison procedure. Suppose the low-pass filtering of the succession of inertial transformation matrices and the low pass filtering of the succession of INS matrices is similar insofar as matrix supply rate and filter transfer characteristics are concerned. Then, because of the distributive properties of the convolution procedures, the inertial transformation matrix corrections can be generated instead by low-pass filtering the differences between the unfiltered inertial transformation matrices and the unfiltered INS matrices. This substantially reduces the complexity of the calculations.

FIG. 6 shows apparatus for doing this. INS matrix data from an inertial navigation system 600 are supplied as minuend input signal to a subtractor 601. Subtractor 601 receives as subtrahend input signal the output signal from the transformation matrix generator. The difference output signal is supplied as the input signal for a digital low-pass filter 610. A multiplexer 620 initially selects data descriptive of an initial INS matrix as write input signal to buffer memory 45 of the FIG. 2 transformation matrix generator and thereafter selects the low-pass filter 610 response to buffer memory 45 as write input signal. (If the FIG. 1 transform matrix generator is considered, rather than the FIG. 2 transformation matrix generator, multiplexer 620 is not required. Instead, INS matrix data are directly supplied from inertial navigation system 600 to memory 24 for its initialization; and low-pass filter 610 response is recurrently applied as an addend to adder 25 by a tristate latch which otherwise supplies a zero addend to adder 25.).

The digital low-pass filter 610 shown in FIG. 6 is one designed to provide a roll-off response which in the sampled-data realm corresponds to the roll-off response that is provided by a simple resistor-capacitor (RC) filter in the continuous-data realm. As described by A.V. Oppenheim and R.W. Schafer in pages 195–198 and 206–211 of their book DIGITAL SIGNAL PROCESSING published in 1975 by Prentice-Hall Inc. of Englewood Cliffs, NJ, the technique of bilinear transformation may be used to convert the H(s) transfer function of the RC filter in the continuous complex-frequency s plane to the corresponding H(z) transfer function, as expressed in the z-transform used to describe sampled-data operation. The transfer function H(s) for a simple RC low pass filter is as follows.

$$H(s) = (1+sRC)^{-1} = (1+s\tau)^{-1} \quad (15)$$

The bilinear transform generates H(z) from H(s)) by making the following substitution for s, where T is the sampling interval.

$$s = 2T^{-1}(1-z^{-1})(1+z^{-1})^{-1} \quad (16)$$

This substitution results in equation (17) following.

$$H(z) = \frac{\mu(1+z^{-1})}{1+\nu z^{-1}} \quad (17)$$

where $$\mu = T(2\tau+T)^{-1} \quad (18)$$

$$\nu = (2-T)(2+T)^{-1} \quad (19)$$

For a continuous stream of sample words, the low-pass filter function described by equations (17), (18) and (19) would be provided by a low-pass filter configuration similar to that of filter 610, except for nine-word delay elements 611 and 615 being replaced by one-word delay elements, as may be described by one skilled in the art of digital design simply by inspecting the equations. The numerator of the fraction describing transfer function H(z) in equation (17) is a filter response zero provided by adding each sample word to its predecessor in an adder 612, then scaling the result by the factor $\mu$ in an analog multiplier element 613. The denominator of the fraction in equation (17) is a filter response pole provided by adding each sample word in an adder 614 to the preceding sum response of adder 614 as scaled by the factor $v$ in analog multiplier element 616.

In low-pass filtering the difference matrix supplied from subtractor 601, sample words for corresponding position in the matrix occur only every ninth word if filter calculations are done sequentially (rather than in parallel) so delay elements 611 and 615 have to provide nine-word (rather than one-word) delay. Since analog multiplications by multipliers 613 and 616 are performed using fixed-value multipliers $\mu$ and $v$, the multiplications can be performed without appreciable delay by table look-up from read-only memory. If other forms of multiplier are used which involve appreciable delay, the delay in multiplier 616 can provide a portion of the nine-word delay that delay element 615 would otherwise have to provide.

The time constant $\tau=RC$ for low-pass filter 610 is long, typically of the order of a few seconds. Accordingly, it is practical to use a dedicated microprocessor, instead of the FIG. 6 digital hardware, which microprocessor is conditioned by its programming to perform the matrix subtraction and low-pass filtering procedures.

There are some simplifications made in FIG. 1 with regard to how information from the rate-sensing gyros 11-13 can be actually processed to generate streams of incremental yaw, pitch and roll angles. The static error introduced by the gyro axes not beding exactly mutually perpendicular is a static error. It is desirable to compensate this error to reduce reliance on the feedback loop for correcting this error. Accordingly, the raw outputs $\alpha_{RAW}$, $\beta_{RAW}$, $\gamma_{RAW}$ of the rate-sensing gyro as converted to digital form are preferably orthogonalized by an initial matrix multiplication as follows $$\begin{bmatrix} \alpha \\ \beta \\ \gamma \end{bmatrix} = \begin{bmatrix} (1+AZK_1) & AZK_2 & AZK_3 \\ ELK_1 & (1+ELK_2) & ELK_3 \\ RLK_1 & RLK_2 & (1+RLK_3) \end{bmatrix} \cdot \begin{bmatrix} \alpha_{RAW} \\ \beta_{RAW} \\ \gamma_{RAW} \end{bmatrix} \quad (20)$$

This is preferably done in matrix multiplier hardware located directly following the analog-to-digital converters 14, 15 and 16. The raw gyro rates $\alpha_{RAW}$, $\beta_{RAW}$, $\gamma_{RAW}$, and the processed gyro rates $\alpha$, $\beta$, $\gamma$ equation (20) are in a system that has been constructed using two's complement data each expressed in two-word, thirty-two-bit format. The azimuth correction (or yaw-correction) coefficients $AZK_1$, $AZK_2$, $AZK_3$; the elevation-correction (or pitch-correction) coefficients $ELK_1$, $ELK_2$, $ELK_3$; and the roll-correction coefficients $RLK_1$, $RLK_2$, $RLK_3$ are single-word, sixteen-bit two's complement data each in the range $-2^{-4}$, inclusive, to $-2^{-4}$, exclusive.

The raw gyro rates $\alpha_{RAW}$, $\beta_{RAW}$, $\gamma_{RAW}$ are scaled by a scale factor $k^{-1}$ prior to analog-to-digital conversion better to utilize the range of the analog-to-digital converters 14-16 (and possibly to avoid the possibility of a product matrix with elements as large as or larger than unity). The processed gyro rates $\alpha$, $\beta$, $\gamma$ at are in actuality multiplied by kt rather than just incremental time t, to remove the $k^{-1}$ scale factor.

Matrix multiplying errors may be reduced, thereby avoiding reliance on the feedback correction loop, also. This has been done by employing double-precision processing to thirty-two bits in matrix multiplying means and rounding the product to the nearest significant bit rather than truncating it. Reducing matrix multiplying errors by employing greater arithmetic precision facilitates the corrections for non-orthogonality of transformation matrices.

In certain applications such as the control of missile flight that is completed in a short time there may be no need to correct for non-orthogonality of the T matrices that the inertial transformation matrix generator produces. Despite TMG matrix update rate being low enough that incremental angles evidence considerable error insofar as small angle approximations are concerned, the accumulated error may not be large enough at the end of the flight time to be of consequence.

FIG. 7 shows overall the processing of signals in a system using the inertial transform matrix generator of the invention to stabilize detection data from a sensor. A set 700 of gyros supplies a matrix 701 of raw gyro data that is orthogonalized by being matrix multiplied by an orthogonalizing matrix 702, per equation (20), to generate a matrix 703 of processed gyro data. The matrix 703 is processed in a processor 704 to generate the incremental Euler transform or matrix 705, which multiplies a previous TMG matrix 706 to form a product matrix to which a drift correction matrix 707 is added to generate the current TMG matrix 708. The product of the INS matrix 709 and a first boresight correction matrix 710 is the initialization value for previous TMG matrix 706, and this product matrix has the current TMG matrix 708 subtracted therefrom to generate an error matrix 711 supplied as input signal to a low-pass filter 712. The low-pass response of filter 712 provides the drift correction matrix 707. First boresight correction matrix 710 refers the initialization data in NED coordinates, or as translated from NED to body coordinates, to the actual positioning of the gyro axes.

A second boresight correction matrix 713 compensates Cartesian-coordinate data x, y, z originating from a sensor 714 for the displacements between their reference axes and the gyro axes. The Cartesian-coordinate data are generated by a converter 715 responding to data from the sensor 714 and are multiplied by the current TMG matrix 708 to account for perturbations of the gyro positions respective to the aircraft body and are further multiplied by the second boresight correction to develop a description of sensor data in the coordinate system to which the gyros are referenced. A converter 716 converts these sensor data into polar coordinates of azimuth and elevation respective to the coordinate system in which the initialization data are expressed.

The relationships of the sensor, gyro and INS coordinate systems by first and second boresight transforms is illustrated in the lower right corner of FIG. 7.

One skilled in the art of digital electronics systems design will be enabled by the foregoing disclosure to design a number of variations of the particular transformation matrix generation system particularly described, and this should be borne in mind when construing the scope of the ensuing claims, which are intended to provide protection for all such embodiments of the invention.

What is claimed is:

1. An inertial transformation matrix generator for generating an Euler transformation matrix in inertial coordinates, to be installed in a craft having an inertial navigation system, for use in converting to inertial coordinates the response of a craft-borne sensor hard mounted on the hull of a craft, said inertial transformation matrix generator comprising:

first, second and third rate-sensing gyros, located proximate to said sensor, for being strapped down to said craft hull, and oriented to sense motion of the craft hull in three mutually orthogonal directions, for providing respective output signals indicative of components of craft hull motion in each of said three mutually orthogonal directions;

analog-to-digital conversion circuitry for digitizing the output signals of said first, second and third gyros;

means for generating successive incremental Euler transformation matrices based on said digitized output signals of said first, second and third gyros;

means for matrix multiplying together each successive said incremental Euler matrix and a respective other matrix to generate a respective product matrix, said other matrix initially being an initialization matrix from said inertial navigation system and thereafter being the previously calculated Euler transformation matrix; and means for forming each successive current Euler transformation matrix from each successive product matrix.

2. An inertial transformation matrix generator as set forth in claim 1, wherein said means for generating successive incremental Euler transformation matrices includes:

means for multiplying an orthogonalizing matrix by the digitized output signals of said first, second and third gyros, to compensate for any departure of the axes of said first, second and third gyros from mutual perpendicularity.

3. An inertial transformation matrix generator as set forth in claim 1 wherein said craft is an aircraft.

4. An inertial transformation matrix generator as set forth in claim 1 wherein said craft is a spacecraft.

5. An inertial transformation matrix generator as set forth in claim 1 wherein said craft is a seacraft.

6. An inertial transformation matrix generator as set forth in claim 1 wherein said craft is an underseacraft.

7. An inertial transformation matrix generator as set forth in claim 1 wherein said craft is a landcraft.

8. An inertial transformation matrix generator as set forth in claim 1 said inertial transformation matrix generator including:

means for periodically comparing the average values of successive ones of the generated Euler transformation matrices and of successive ones of the inertial navigation system matrices thereby to generate correction matrices; and means for adding to the product matrix any concurrent correction matrix supplied from said means for periodically comparing averages, included within said means for forming each successive Euler transformation matrix from each successive product matrix.

9. An inertial transformation matrix generator as set forth in claim 8 wherein said means for periodically comparing the average values of successive ones of the generated Euler transformation matrices and of successive ones of the inertial navigation system matrices comprises:

means for supplying the generated Euler transformation matrices and the inertial navigation system matrices with corresponding elements of the matrice in temporal alignment;

means for subtracting each element of the generated Euler transformation matrix from the corresponding element of inertial navigation system matrix to generate a respective one of a succession of difference matrices; and means for low-pass filtering said difference matrices to generate said correction matrices.

10. An inertial transformation matrix generator as set forth claim 8 wherein said means for generating successive incremental Euler transformation matrices includes:

means for multiplying an orthogonalizing matrix by the digitized output signals of said first, second and third gyros, to compensate for any departure of the axes of said first, second and third gyros from mutual perpendicularity.

11. An inertial transformation matrix generator for generating an Euler transformation matrix in inertial coordinates, to be installed in a craft having an inertial navigation system for use in converting to inertial coordinates the responses of a craft-borne sensor hard mounted on the hull of a craft, aid inertial transformation matrix generator comprising:

first, second and third rate-sensing gyros, located proximate to said sensor, for being strapped down to said craft hull, and oriented to sense motion of the craft hull in three mutually orthogonal directions, for providing respective output signals indicative of components of craft hull motion in each of said three mutually orthogonal directions;

analog-to-digital conversion circuitry for digitizing the output signals of said first, second ad third gyros;

means for generating successive incremental Euler transformation matrices based on said digitized output signals of said first, second and third gyros;

means for matrix multiplying together each successive said incremental Euler matrix and a respective other matrix to generate a respective product matrix, said other matrix initially being an initialization matrix from said inertial navigation system and thereafter being the previously calculated Euler transformation matrix;

means for periodically comparing the average values of successive ones of the generated Euler transformation matrices and of successive ones of the inertial navigation system matrices thereby to generate correction matrices; and means for forming each successive current Euler transformation matrix from each successive product matrix, including means for adding to the product matrix any concurrent correction matrix supplied from said means for periodically comparing averages, wherein said means for matrix multiplying comprises:

a multiplier having first and second input ports and an output port;

an accumulator including therein said means for adding, having an input port to which the output port of said multiplier is connected and having an output port;

a memory for temporarily storing the incremental Euler transformation matrix, as written thereto from said means for digitizing the output signals of said gyros, and as read therefrom in an element by element scanning to the first input port of said multiplier;

a memory for temporarily storing said other matrix, as read therefrom in an element by element scanning to the second input port of said multiplier; and a memory for temporarily storing said updated Euler transformation matrix, as written thereto from the output port of said accumulator, and as read therefrom as said previously calculated Euler transformation matrix for writing said memory for temporarily storing said other matrix.

12. An inertial transformation matrix generator for generating an Euler transformation matrix in inertial coordinates, to be installed in a craft having an inertial navigation system for use in converting to inertial coordinates the responses of a craft-borne sensor hard mounted on the hull of a craft, said inertial transformation matrix generator comprising:

first, second and third rate-sensing gyros, located proximate to said sensor, for being strapped down to said craft hull, and oriented to sense motion of the craft hull in three mutually orthogonal directions, for providing respective output signals indicative of components of craft hull motion in each of said three mutually orthogonal directions;

analog-to-digital conversion circuitry for digitizing the output signals of said first, second and third gyros;

means for generating successive incremental Euler transformation matrices based on said digitized output signals of said first, second and third gyros;

means for matrix multiplying together each successive said incremental Euler matrix and a respective other matrix to generate a respective product matrix, said other matrix initially being an initialization matrix from said inertial navigation system and thereafter being the previously calculated Euler transformation matrix; and means for forming each successive current Euler transformation matrix from each successive product matrix, wherein said means for matrix multiplying comprises:

a multiplier having first and second input ports and an output port;

an accumulator including therein said means for adding, having an input port to which the output port of said multiplier is connected and having an output port;

a memory for temporarily storing the incremental Euler transformation matrix, as written thereto from said means for digitizing the output signals of said gyros, and as read therefrom in an element by element scanning to the first input port of said multiplier;

a memory for temporarily storing said other matrix, as read therefrom in an element by element scanning to the second input port of said multiplier; and a memory for temporarily storing said updated Euler transformation matrix, as written thereto from the output port of said accumulator, and as read therefrom as said previously calculated Euler transformation matrix for writing said memory for temporarily storing said other matrix.

13. A combination including a craft-borne sensor hard mounted on the hull of a craft having an inertial navigation system;

apparatus for generating an Euler transformation matrix in inertial coordinates; and a matrix multiplier for multiplying data from said sensor by said Euler transformation matrix in inertial coordinates, wherein said apparatus for generating an Euler transformation matrix in inertial coordinates is an inertial transformation matrix generator comprising:

first, second and third rate-sensing gyros, located proximate to said sensor, strapped down to said craft hull, and oriented to sense motion of the craft hull in three mutually orthogonal directions, for providing respective output signals indicative of components of craft hull motion in each of said three mutually orthogonal directions;

analog-to-digital conversion circuitry for digitizing the output signals of said first, second and third gyros;

means for generating successive incremental Euler transformation matrices based on said digitized output signals of said first, second and third gyros;

means for matrix multiplying together each successive said incremental Euler matrix and a respective other matrix to generate a respective product matrix, said other matrix initially being an initialization matrix from said inertial navigation system and thereafter being the previously calculated Euler transformation matrix; and means for forming each successive current Euler transformation matrix from each successive product matrix.

14. A combination as set forth in claim 13 wherein said means for generating successive incremental Euler transformation matrices includes:

means for multiplying an orthogonalizing matrix by the digitized output signals of said first, second and third gyros, to compensate for any departure of the axes of said first, second and third gyros from mutual perpendicularity.

15. An inertial transformation matrix generator as set forth in claim 13, wherein said means for matrix multiplying comprises:

a multiplier having first and second input ports and an output port;

an accumulator including therein said means for adding, having an input port to which the output port of said multiplier is connected and having an output port;

a memory for temporarily storing the incremental Euler transformation matrix, as written thereto from said means for digitizing the output signals of said gyros, and as read therefrom in an element by element scanning to the first input port of said multiplier;

a memory for temporarily storing said other matrix, as read therefrom in an element by element scanning to the second input port of said multiplier; and a memory for temporarily storing said updated Euler transformation matrix, as written thereto from the output port of said accumulator, and as read therefrom as said previously calculated Euler transformation matrix for writing said memory for temporarily storing said other matrix.

16. A combination as set forth in claim 13 wherein said craft is an aircraft.

17. A combination as set forth in claim 13 wherein said inertial transformation matrix generator includes:
- means for periodically comparing the average values of successive ones of the generated Euler transformation matrices and of successive ones of the inertial navigation system matrices thereby to generate correction matrices; and
- means for adding to the product matrix any concurrent correction matrix supplied from said means for periodically comparing averages, included within said means for forming each successive Euler transformation matrix from each successive product matrix.

18. A combination as set forth in claim 17 wherein said means for periodically comparing the average values of successive ones of the generated Euler transformation matrices and of successive ones of the inertial navigation system matrices comprises:
- means for supplying the generated Euler transformation matrices and the inertial navigation system matrices with corresponding elements of the matrice in temporal alignment;
- means for subtracting each element of the generated Euler transformation matrix from the corresponding element of inertial navigation system matrix to generate a respective one of a succession of difference matrices; and
- means for low-pass filtering said difference matrices to generate said correction matrices.

19. A combination as set forth in claim 17, wherein said means for multiplying comprises:
- a multiplier having first and second input ports and an output port;
- an accumulator including therein said means for adding, having an input port to which the output port of said multiplier is connected and having an output port;
- a memory for temporarily storing the incremental Euler transformation matrix, as written thereto from said means for digitizing the output signals of said gyros, and as read therefrom in an element by element scanning to the first input port of said multiplier;
- a memory for temporarily storing said other matrix, as read therefrom in an element by element scanning to the second input port of said multiplier; and
- a memory for temporarily storing said updated Euler transformation matrix, as written thereto from the output port of said accumulator, and as read therefrom as said previously calculated Euler transformation matrix for writing said memory for temporarily storing said other matrix.

20. A combination as set forth in claim 17 wherein said means or generating successive incremental Euler transformation matrices includes:
- means for multiplying an orthogonalizing matrix by the digitized output signals of said first, second and third gyros, to compensate for any departure of the axes of said first, second and third gyros from mutual perpendicularity.

* * * * *